(12) United States Patent
Sherwood

(10) Patent No.: US 6,481,565 B1
(45) Date of Patent: Nov. 19, 2002

(54) CONVEYOR SYSTEM WITH PNEUMATIC TRANSFER

(76) Inventor: Bernard J. Sherwood, 8310 - Concession Rd #2 R.R.#1, Lisle, On., L0M 1M0 (CA)

( * ) Notice: Subject to any disclaimer, the term of this patent is extended or adjusted under 35 U.S.C. 154(b) by 79 days.

(21) Appl. No.: 09/670,027

(22) Filed: Sep. 26, 2000

(51) Int. Cl.[7] .............................................. B65G 13/02
(52) U.S. Cl. .................................................. 198/689.1
(58) Field of Search ........................... 198/689.1, 860.2

(56) References Cited

U.S. PATENT DOCUMENTS

| | | | | |
|---|---|---|---|---|
| 3,827,548 A | * | 8/1974 | Matsuo | 198/689.1 |
| 4,645,069 A | * | 2/1987 | Sjogren | 198/689.1 |
| 5,648,140 A | * | 7/1997 | Vaders | 198/689.1 X |
| 5,697,606 A | * | 12/1997 | Maass | 198/689.1 X |
| 5,779,236 A | * | 7/1998 | Duncan, Jr. et al. | 198/689.1 X |

FOREIGN PATENT DOCUMENTS

| | | | | |
|---|---|---|---|---|
| JP | | 113622 | * 9/1981 | 198/689.1 |

* cited by examiner

Primary Examiner—James R. Bidwell
(74) Attorney, Agent, or Firm—D. W. Eggins

(57) ABSTRACT

A conveyor vacuum system for transporting objects while applying vacuum to their undersides has a series of self-contained suction transfer blocks, each with a sensor low pressure air jet for detecting the presence of an article upon the conveyor belt, which sensor directly controls the application of high vacuum from an air driven ejector through the conveyor belt, to draw-down and secure the overlying object to the belt. A position encoder driven off the conveyor end pulley gives accurate stop/start operation of the conveyor (including reversal) for multiple work stations. Side by side conveyors can be clutch-driven from a common drive shaft. Return air has oily contaminants removed. The transfer blocks may also be "blown" to help support a load on the belt.

10 Claims, 5 Drawing Sheets

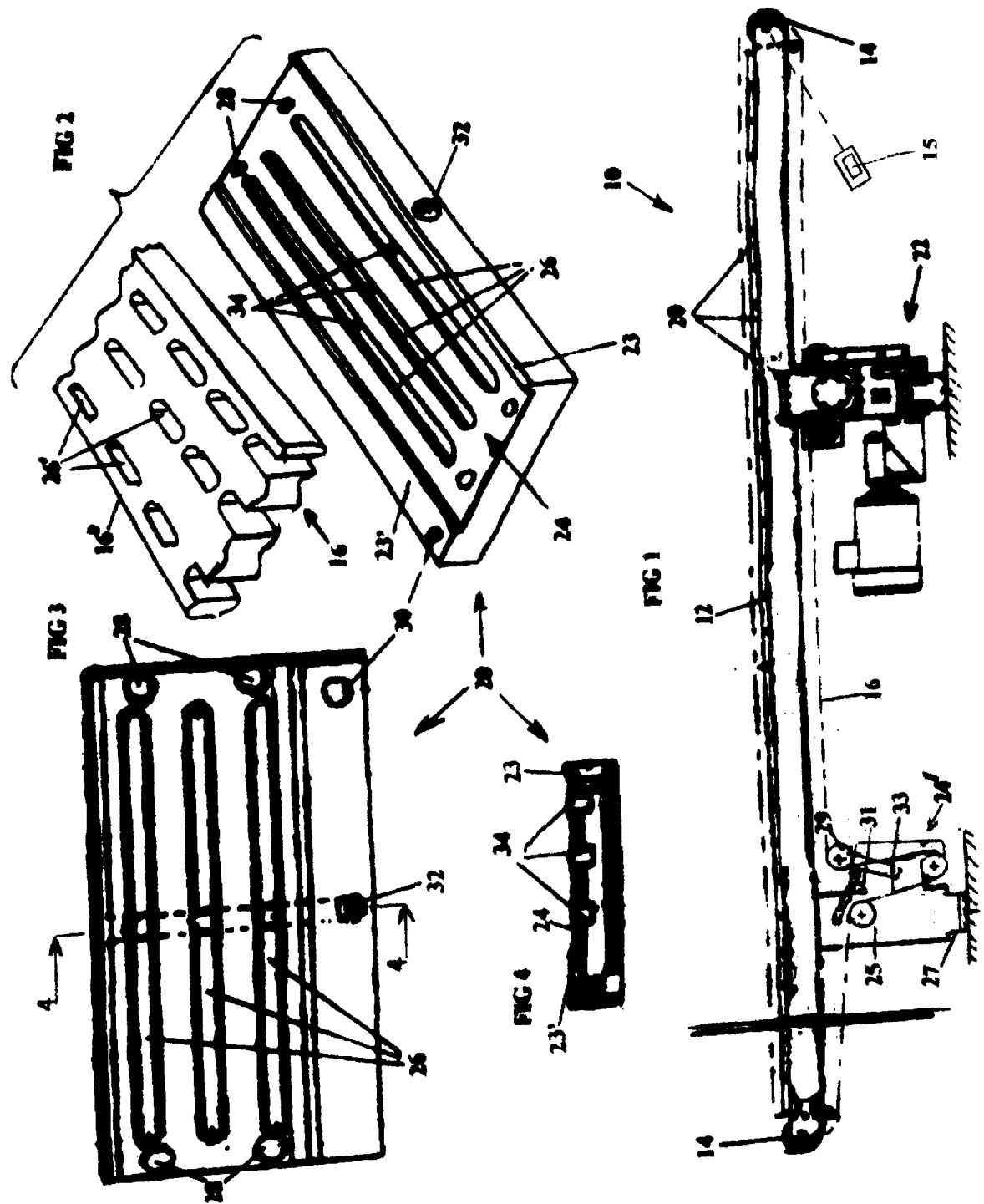

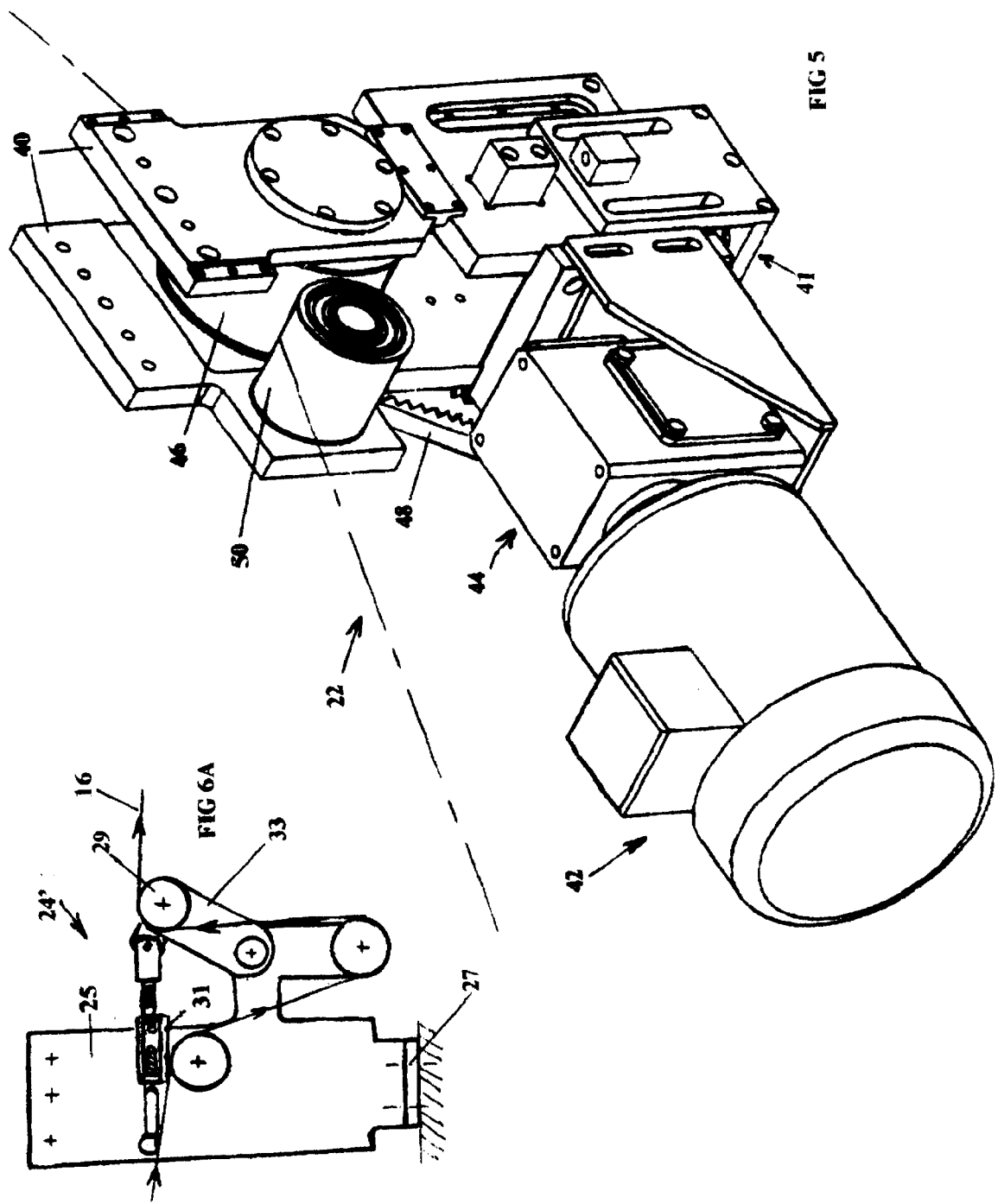

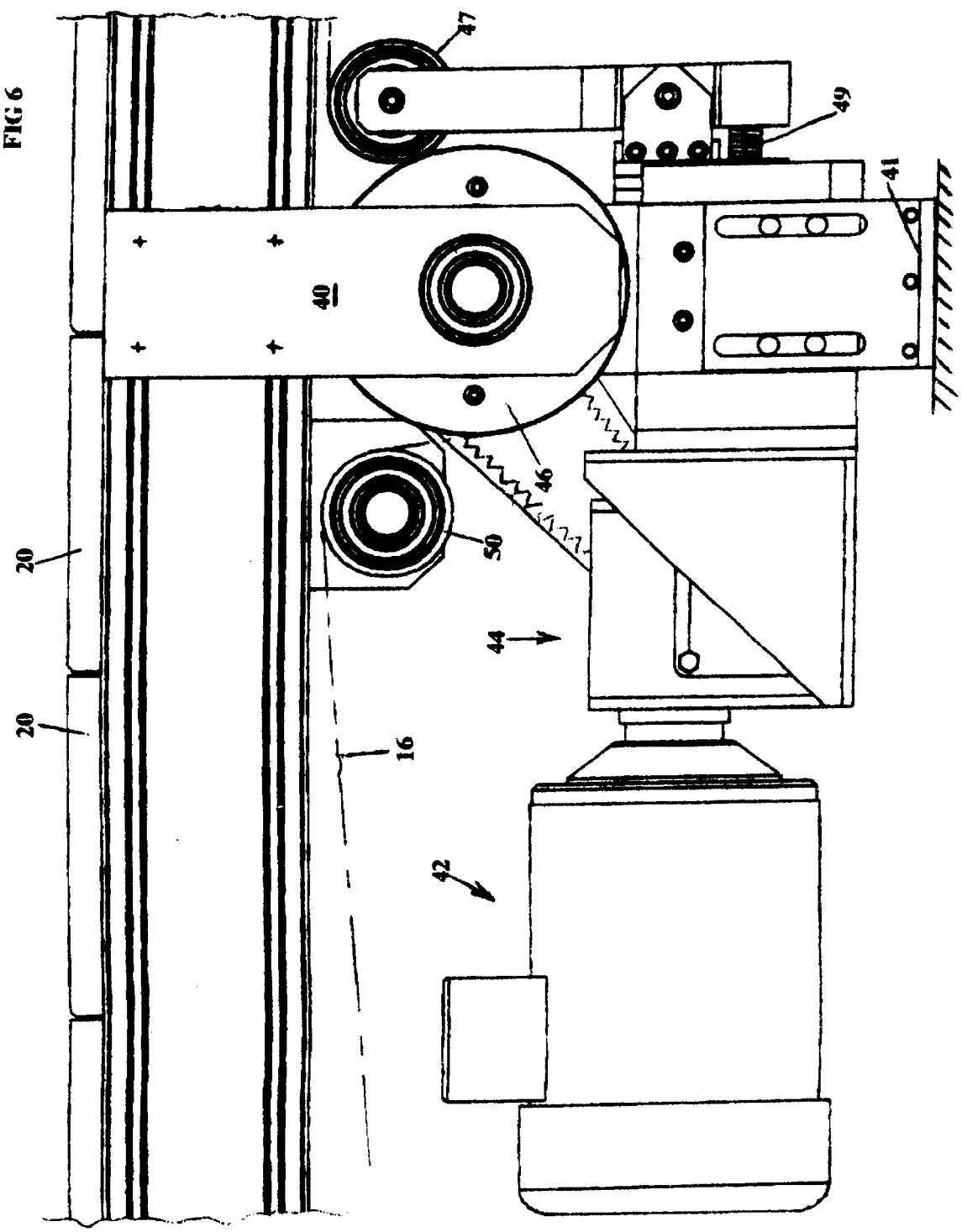

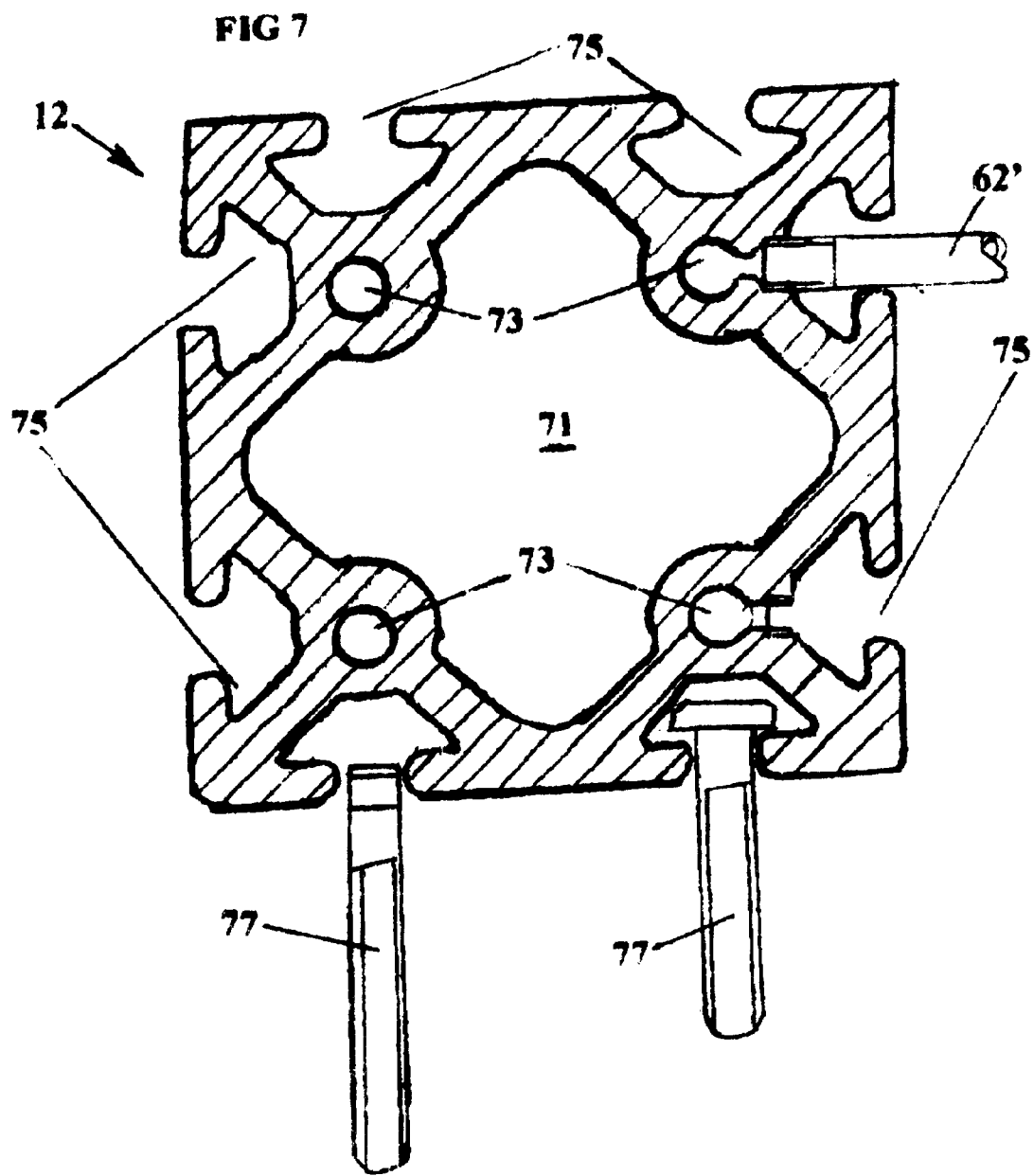

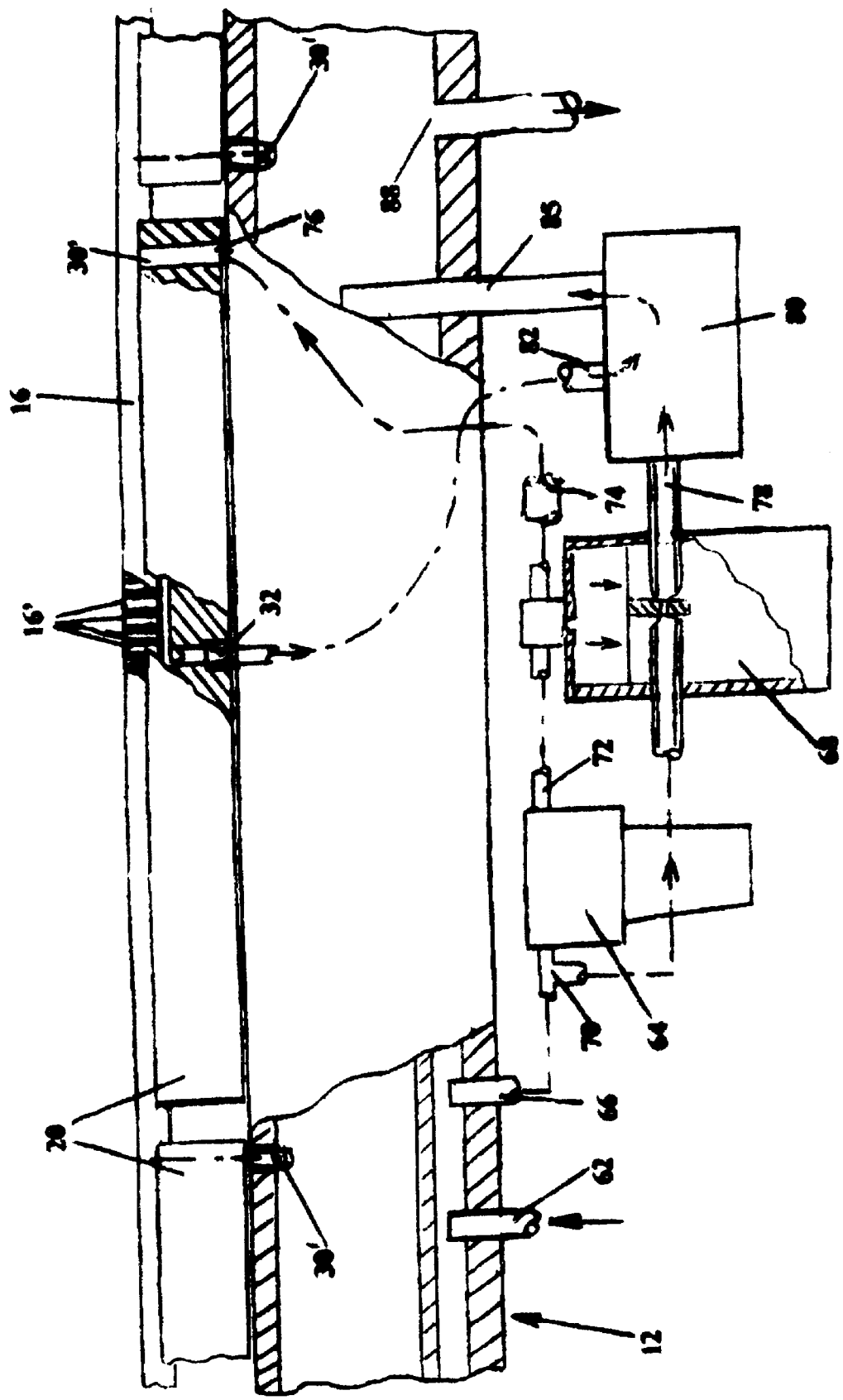

CONVEYOR SYSTEM WITH PNEUMATIC TRANSFER

BACKGROUND OF THE INVENTION

1. Field of the Invention

This invention is directed to a belt conveyor system, and in particular to a conveyor system incorporating pneumatic transfer.

2. Description of the Prior Art

Belt conveyors for transferring articles are widely used in industry, including incorporation as integral parts of production lines, for a wide range of products,. Such production lines frequently have work stations at spaced intervals, at which the conveyor is required to stop, to enable working upon the conveyed article. In such instances the precise monitoring of the displacement of the conveyor belt along its path becomes very important. Present systems, which monitor travel of the conveyor belt for such location purposes by encoding the revolutions of the driving motor, suffer from inaccuracy, due to belt slippage which generates discrepancies between rotation of the driving motor and the actual travel of the belt. Inconsistencies in belt tension, with consequent variations in the rates of belt slippage, exacerbate this problem.

Certain types of article, for example lightweight articles having relatively large surface areas, such as plastic sheets, sheets of thin metal, cardboards, including cardboard blanks and blocks generally have smooth, low friction surfaces that make their transfer and handling most difficult. In some instances, such problems are accentuated, due to the relative fragility of the articles, or other factors such as a susceptibility to becoming marked on their surfaces, as a consequence of transfer to or passage along a conveyor, including encounter with hard stops and position sensing mechanical feelers.

The use of pneumatic transfer with conveyor systems is well known, and widely practiced, both in regard to belt conveyors and for agricultural purposes, such as the blowing of grain along pipes.

In the case of belt conveyors with pneumatic transfer many existing systems are characterized by their use of wide-area suction chambers, with associated unduly large air-mass displacement requirements, in the form of generated vacuum, or of compressed air. The response times of such systems is unduly slow, while the necessary air displacement is large, and excessive forces may be generated against system components, including the associated friction drag upon the belt. In other systems, the large size of certain vacuum system components necessitates unduly large belt turning radii, with correspondingly large end pulleys and related space requirements.

It should be noted that the size of a conveyor system per se, both in height and width, can bear significant economic implications, with down-sizing being most desireable. This has particular bearing on the size and location of the necessary anciliary systems associated with the conveyor. The driving systems for conveyors usually employ a chain or other transmission acting upon the end roller of the conveyor, usually at the oncoming end. Certain disadvantages associated with these earlier arrangements include unsatisfactory frictional tractive effort between the pulley and the belt, due to the limited (180 degree or less) wrap of the belt on the pulley, and shortage of space at the conveyor end, where the motor and reduction gear are located. Also, this system limits and complicates the belt tensioning arrangements, as tractive transfer at the pulley is dependent upon the extent of belt wrap about the pulley, and belt tension.

Inadequate belt tensioning also results in excessive lost motion when the drive is reversed, in order to reverse the conveyor. This exacerbates the problems encountered in achieving accurate registry of the conveyor with the associated workstations.

The handling of ferritic sheet metal production lines has involved magnetic conveyors, which employ magnets to secure the sheet to the conveyor. There is a requirement to handle sheets of different thickness, and to permit precise manipulation of them for purposes such as the welding together of two adjoining sheets of different thickness, to form welded blanks for automotive stampings, for which operations the characteristics of magnetic attachment are not well suited. Magnetic conveyors are also ineffective for handling aluminum or stainless steel sheet.

SUMMARY OF THE INVENTION

The present invention provides a modular pneumatic transfer system for conveyors, the conveyor system consisting of a plurality of individual transfer blocks, over which a perforated conveyor belt runs.

The aligned transfer blocks occupy the top of a beam that extends the length of the conveyor. The subject modular system incorporates a transfer suction block for operation with a belt conveyor, the system incorporating an air driven, reaction sensing means to determine the presence of an article upon the conveyor above the block; air-driven vacuum generation means; and a pneumatic control actuated by the sensing means to operate the vacuum generation means, to apply vacuum by way of the suction block, through the perforated belt to the over-lying section of the conveyor, in response to the sensed presence of an object upon that section of the conveyor.

The vacuum generation means consists of a multi-stage air-driven venturi, having a high pressure air jet or jets discharging through convergent-divergent nozzles, serving as an air ejector, to thereby provide a source of high volume air flow, generating a correspondingly rapid rate of high vacuum, which is applied to the suction block of a module.

In one embodiment, each module may have its respective vacuum generator. However, it will be understood that a larger vacuum generator may be used to service a number of modules, the respective object-sensing sensors being used to switch the vacuum to the related module.

The reaction sensing means consists of low pressure air jet means having an escape flow path immediately adjacent an edge of the conveyor belt, the partial blocking of which flow path by the presence of an overlying object causes a build-up in back-pressure in the air supply circuit of the sensor, sufficient to actuate an air servo-valve, thereby admitting supply air to the air displacement (vacuum generation) means. This action causes rapid displacement of air from the transfer block, and applies suction to the block, which suction is transferred through the perforated belt to the overlying object, causing it to be drawn down to the belt, and transferred.

In the preferred system embodiment the subject suction blocks are each part of an individual module, each module being essentially self contained, with its own sensing means and associated air displacement unit. This enables the provision of exceedingly compact system elements, the modular nature of which enable the provision of conveyors of virtually any desired length.

The suction blocks are selectively located to provide a desired presence-sensing and air displacement pattern in conjunction with the adjoining, superposed perforated conveyor belt. In the preferred embodiment the low pressure sensing jet forms a part of the suction block. However it will be understood that this is not imperatively the case, as the sensor may be physically located independent of the suction block.

The suction blocks are of generally small size, being made of hardened, Teflon (T.M.) coated a aluminum, or of plastic or ceramic, and being further characterized by having a shallow top groove for passage of a conveyor belt thereal-ong. The belt fits closely in the groove, the groove sides serving to guide the belt in its passage along the beam, and to complement the sealing of the belt to the block with substantially no increase in wear or drag upon the belt or the block.

The conveyor has a series of the subject suction blocks mounted in mutual, substantially end-to-end relation upon a hollow beam extending the length of the conveyor, portions of the beam interior serving as air passages for the conveyor air system.

In operation, a respective suction block only comes into operation when the belt portion passing over that block is carrying something that obstructs the sensor so as to actuate the air servo, thus energizing the air transfer means, which in this case operate as vacuum generation means, thereby applying suction to the associated block.

The surface of the suction block has discrete, longitudinally extending air-way grooves positioned laterally directly below the longitudinal axis along which the vertical apertures of the belt are located. This directs the suction applied to the block directly to the belt apertures, and thus minimizes the suction force acting upon the belt, per se; while also minimizing the interior air space, and the mass air displacement required to effect vacuum at the belt upper surface.

The block module thus provides an extremely rapid suction response to operation of the sensor, with correspondingly rapid operation of the air transfer means Accordingly, it will be appreciated that the reaction forces generated between the belt and the suction block consist normally of only the load applied by the belt and its superimposed load; and that the addition of suction forces acting upon the belt occurs only when the sensor of a selected block is activated by the presence of a superimposed load object upon the belt, whereby the respective individual block system is energized, and suction is applied to the block, causing draw-down to the belt of the overlying object. Thus, the major reactive forces brought into play by operation of the block under vacuum, are between the belt upper surface and the overlying object. In this way, the gross frictional drag between the block and the belt is minimized.

The system includes a novel belt drive arrangement. This includes an electric drive motor driving a reduction gear, the output of which is transferred by a toothed belt to the conveyor belt driving pulley. A pair of guide pulleys on opposite sides of the drive pulley provide a deep, variable draw of the conveyor belt about the drive pulley, by controlling the extent of belt wrap about the drive pulley. The variable one of the guide pulleys can also be adjusted to control the pressure of the conveyor belt against the surface of the drive pulley, which may be rubber-coated. The variable guide pulley may have an adjustable loading spring, to promote consistent conveyor belt tension and drive-pulley contact pressure, and may include a pulley position indicator.

The conveyor belt drive and tensioning unit, which operates on the return run of the conveyor belt, is preferably located intermediate the ends of the conveyor section, thus enabling the use of smaller conveyor end rolls, while locating the belt drive in a more accessible location.

A particular advantage of this arrangement is that conveyor belt backlash is virtually eliminated, so that in the event of reversing the conveyor there is no lost motion, due to belt slack and/or gear back-lash. This facilitates accurate "station-keeping" in relation to adjusting and maintaining the stopping and starting of the conveyor in step with the work stations, by the operation of the location encoder.

In the present invention the encoder is driven off the conveyor belt end pulley, in contrast to the prior art systems that have the location encoder driven off the electric drive motor, as discussed above.

The conveyor drive includes a foot bracket, and side brackets that are attached to the sides of, and support the conveyor beam, such that one end of the conveyor is supported on the foot bracket, by means of which the conveyor may be secured to the floor, or from a framework.

The conveyor drive may consist of a central motor driving a number of conveyors by way of a transversely extending splined shaft, thus providing a flexible arrangement for the lateral repositioning of the respective conveyors along the length of the shaft.

In such an arrangement, each conveyor drive is connected to the splined shaft through a clutch, which allows conveyors to be shut off when not needed.

The modular suction blocks can also be utilized as blower blocks, wherein, upon the sensing of an object above the block, the servo-valve admits air to the block at a predetermined pressure above atmospheric, to serve as a supporting air cushion for the sensed object. One example of this aspect of the modular block might be a conveyor system having a pair of spaced outer belts running on "vacuum" for the transfer of objects such as large steel sheets, wherein the system includes a number of modular "pressure" blocks located intermediately of the two outer belts, being equipped with the air sensor, and being supplied with air under pressure, in the presence of a sensed load, and serving as air-cushion blocks, over which the load rides.

The upper surface of these blocks would be substantially level with the top surface of the two outer belts, such that, upon the approach of a transported sheet, the outer suction blocks associated with the two conveyor belts would be actuated to apply suction to the overlying sheet, to hold it to the conveyor belts. Meanwhile, the intermediate blower blocks would serve as support slippers, over which the transported sheet would ride upon the individual air cushions of the respective blower blocks.

Owing to the individual sensing jets of both the suction and the blower block modules, air consumption is minimized, as air pressure is applied to each of the multi-stage vacuum-creating ejectors and to each blow block only when the presence of the transported sheet is sensed in the immediate vicinity of the respective block.

On passage of the sheet beyond any one of the respective blocks, the respective high pressure or ejector air supply is terminated. Thus, highly efficient utilization of air is achieved.

BRIEF DESCRIPTION OF THE DRAWINGS

Certain embodiments of the invention are described by way of illustration, without limitation thereto other than as set forth in the accompanying claims, reference being made to the accompanying drawings, wherein:

FIG. 1 is a side elevation of the static elements of a belt conveyor in accordance with the present invention, the belt run path being represented by a chain-dotted line;

FIG. 2 is a perspective view of a subject conveyor block module, and a portion of a perforated conveyor belt adjacent thereto;

FIG. 3 is a plan view of the conveyor block module;

FIG. 4 is a transverse section of the block module, taken at 4—4 of FIG. 3;

FIG. 5 is a perspective view of a conveyor belt drive assembly;

FIG. 6 is a side view of a conveyor support pedestal and belt drive assembly of FIG. 5;

FIG. 6A is a side view of the other support pedestal and the primary belt tensioner;

FIG. 7 is an end section of the beam portion of a conveyor; and.

FIG. 8 is a schematic side, elevational view of a portion of a conveyor, with the associated air transfer equipment of the module.

DETAILED DESCRIPTION OF THE INVENTION

Referring to FIG. 1, the conveyor, 10 has an extended beam 12 of extruded aluminum section, typically an 80×80 m.m section (see FIG. 8) that runs the length of the conveyor 10.

End rolls 14 are mounted at the ends of the beam 12, about which rolls 14 an endless perforated conveyor belt 16 is trained (see FIGS. 5 and 6). Location encoder 15 is driven by an end roll 14.

A series of transfer blocks 20 extend the length of the conveyor 10, being mounted upon the beam 12.

A belt drive 22 is located beneath the beam 12, in supporting relation therewith, being positioned in the midsection of the conveyor 10, in spaced relation from the end rolls 14. The belt 16 is entrained with the belt drive 22.

The other end of the conveyor 12 is supported (see FIGS. 1 and 6A) by a primary belt tension adjuster 24', which has a single side bracket 25 supporting the conveyor 12, holding it by a foot bracket 27 secured to the floor or frameworks. The roll 29 of adjuster 24' is rotatably mounted in cantilevered relation from a pivotal arm 33, carried on the side bracket 25, leaving the roll 29 fully accessible at its free end, to facilitate removal and replacement of the belt 16.

An adjustable turn-buckle 31, acting upon the pivotal arm 33, serves to provide primary tension to the belt 16, by way of adjusting the length of the turn-buckle 31, so as to reposition the roll 29. Referring to FIGS. 2, 3 and 4, the transfer block 20 is of shallow construction, having a pair of shoulders 23, 23' that border a wide, shallow passage 24 extending the length of the block 20, along which the belt 16 passes.

A series of shallow grooves 26 (illustrated as being three in number) extend almost the fill length of the block 20, the ends of which grooves terminate adjacent the ends of the block 20.

The grooves 26 are laterally spaced within the passage 24 to precisely intercept the apertures 26' of the belt 16, on passage of the belt 16, moving longitudinally thereover. The belt 16 serves to seal-off the grooves 26, such that the transfer of air (or vacuum) is directly between the grooves 26 and the apertures 26', while the belt serves to seal off both lateral and longitudinal air leakage.

The block 20 has two through holes 28 at each end, for securing T-bolt screws 30' that engage the top surface of beam 12 (see FIG. 7).

A vertical jet aperture 30, located on the active side of the transfer block 20, extends through the thickness of the block 20, for the passage of a low-pressure, presence-sensing air jet, directed upwardly along the active edge 16' of the belt 16.

A transverse air passage 32 at the mid point of the block 20 connects by way of apertures 34 with the grooves 26 for the transfer of air therethrough, in either direction, depending on the role served by the block 20.

Turning to FIG. 5, the belt drive 22 has a pair of bracket plates 40 for attachment to the sides of the beam 12, by which the beam 12 is supported, and mounted upon base flange 41. An electric motor 42, driving through reduction gearbox 44, drives the belt drive pulley 46 by way of a toothed belt 48.

A conveyor belt guide pulley 50 is located at the oncoming side of the belt drive pulley 46, with an adjustable, spring loaded pulley 47 (see FIG. 6) at the offgoing side of pulley 46, providing a deep draw to the belt 16 about the pulley 46. An adjustable compression spring 49 loads the guide pulley 47 towards the drive pulley 46, to control the belt contact pressure against the drive pulley.

The vertical locator of the pulley 47 is spring loaded such that the tension of the belt 16 is accomodated, together with the extent of the wrap of belt 16 about the pulley 46, while the pressure of the belt 16 against the rubber covered roll 46 can be accurately controlled.

FIG. 6A shows the turn-buckle 31 of the belt primary tension adjuster 24' in greater detail. Referring to FIG. 8, a portion of conveyor belt 16 is shown passing over a series of transfer blocks 20, the blocks 20 being mounted upon a support beam 12. The beam 12 may be of extruded aluminum, having a cross-section as shown in FIG. 7, with a large, centrally located main chamber 71 and bordering service galleries 73. The square profile has two recesses 75 along each face, for the insertion of T-bolts 77 for attachment purposes, two of which are shown.

One or more service galleries 73 may receive and supply service air, as by way of inlet 62, at about 80 psi. Another service gallery may be placed under vacuum, to provide for vacuum, while the main chamber 71 is used as an atmospheric vent in the subject application.

Two of the galleries 73 are shown having drilled ands tapped (threaded) access for connector nipples 62', one being shown, by means of which connection is made to the respective galleries.

Air at supply pressure is applied to a pressure regulator 64 by way of connector 66, from gallery 73, and supplied to a back-pressure sensing valve 68, by way of connector 70.

The pressure regulator 64 has outlet 72, supplying air at reduced pressure to a connector 74, which connects to the inlet 76 of transfer block 20, to supply the vertical jet aperture 30' (FIG. 2) with low pressure air as a sensing jet.

The outlet 72 also connects with the back-pressure sensing valve 68, supplying low pressure air to it. Operation of the valve 68, by creation of back-pressure at the nozzle 30', serves to admit supply air at high pressure by way of supply outlet 78 to the multi-stage vacuum-creating ejector 80,. Operation of the ejector 80 applies high vacuum by way of outlet 82 to the air passage 32 of the related transfer block 20 (see FIGS. 2 and 3). This vacuum is transferred to the upper surface of the belt 16 (see above), to act upon any body that may be present there.

The exhaust air from the ejector 80 together with air drawn through the belt 16 and the block 20 passes by way of connector 85 to the main chamber 71 of the beam 12.

The chamber 71 of the beam 12 has an atmospheric exhaust drain 88, set low in the chamber, to vent air, together with any carry-over of liquid contaminants drawn down through the system, such as surface oils from off the underface of steel sheet being transferred by the system.

When the system is operating, with the motor 42 driving the belt 12, low pressure air is supplied to the sensing jet aperture 30'. An approaching object, supported on the belt 12, and approaching the subject block 20 intercepts the low pressure jet from the sensor aperture 30' of that block 20, generating back pressure that is sensed by and operates upon the valve 68. Operation of the valve 68 admits air to the ejector 80 by way of the connector 78.

Operation of the ejector 80 applies suction to the vacuum outlet 82, and thence to the air passage 32 of the block 20. The vacuum is transferred through the belt apertures 16' to the upper surface of the belt 16, to those portions of the belt as it passes over the subject transfer block 20.

When the low pressure sensing jet is no longer affected, due -to passage therepast of that portion of the belt 16 carrying the previously sensed object, the back-pressure in the valve 68 drops, thus interrupting the supply of high pressure air to the ejector 80, which ceases operation, thus ending the low pressure regime for that block 20. Activity would normally then transfer to the adjoining block 20, in the path of the belt 16, with a repeat of the sensing and vacuum-generation activity of the respective associated system.

What is claimed is:

1. A conveyor system having a beam of predetermined length, the upper surface of the beam having along its length a plurality of relatively short suction blocks, an endless conveyor belt mounted for passage over the suction blocks for the transfer of articles therewith, the top face of each block having a shallow recess, the side edges of the recess serving to guide the belt, and providing complementary air sealing of the belt with the block; the blocks having mutually aligned, discrete, longitudinally extending, laterally spaced air way grooves; the belt having upwardly extending perforations laterally coincident with the air way grooves, in use to directly apply to the belt a suction supplied to the block, to minimize the effect of suction acing directly on the belt air jet means located adjacent the belt for projecting a low pressure air jet upwardly beside the belt, said air jet means being reactive to the presence of an object overlying the belt; an air servo-valve responsive to a change in back-pressure of the air jet means, and being connected m direct controlling relation with air transfer means for transferring air within the system whereby the pressure of air within the block is modified by said air transfer, to facilitate the passage of said article upon said belt.

2. The conveyor system as set forth in claim 1, said air transfer means operating to reduce the air pressure within said block below atmospheric pressure, to draw said article to said belt.

3. The conveyor system as set forth in claim 2, said air transfer means including air-driven evacuation means connected in suctioning relation with said transfer block.

4. The conveyor system as set forth in claim 1, said air jet means having a low pressure air jet combined with said block.

5. The conveyor system as set forth in claim 1, said belt passing about idler end pulleys rotating m substantial synchronicity with the motion of the belt, the conveyor including position encoder means for indicating the relative displacement of said belt along the active path of travel thereof, said encoder means being driven by rotation of a said: idler pulley, whereby the belt position indication read-out is substantially accurate.

6. The conveyor system as set forth in claim 1, said air transfer means operating to increase the air pressure within said block above atmospheric pressure, whereby said block is an air cushion.

7. The conveyor system as set forth in claim 1, wherein a plurality of said conveyors are ranged in mutual, laterally spaced apart relation.

8. The conveyor system as set forth in claim 1, said air transfer means including a compressed air supply and air ejector means receiving compressed air from said supply, in operation to generate air suction, and means to apply the suction to said transfer block.

9. The conveyor system of claim 1, wherein said endless belt operates in a loop having an active portion and a return loop portion; the conveyor including drive means operating on said belt return loop portion, and tension means to maintain said belt loop at a predetermined tension.

10. The conveyor as set forth in claim 9, said tension means including primary tension applying means in combination with a conveyor support pedestal said tension applying means having at least one variable position roll rotatably supported in cantilevered relation from a movable arm, said arm being supported by said pedestal; and adjustment means for selectively repositioning said arm in tensioning relation with said belt.

* * * * *